3,495,013
METHOD OF TREATING CARDIAC ARRHYTHMIAS WITH N - BENZYL N',N'' - DIMETHYLGUANIDINE
Marvin B. Bacaner, Minneapolis, Minn., assignor to The Regents of the University of Minnesota, Minneapolis, Minn., a corporation of Minnesota
No Drawing. Continuation-in-part of application Ser. No. 573,209, Aug. 18, 1966. This application July 8, 1968, Ser. No. 743,006
Int. Cl. A61k 27/00
U.S. Cl. 424—326                                    6 Claims

ABSTRACT OF THE DISCLOSURE

A method for suppressing cardiac ventricular fibrillation and treating cardiac arrhythmias in animals, both human and otherwise, by administration of N-benzyl N',N''-dimethylguanidine (bethanidine). The drug may be administered prophylactically in the prevention of or in the treatment of ventricular fibrillation or cardiac arrhythmias.

---

This application is a continuation-in-part of my copending application Ser. No. 573,209, filed Aug. 18, 1966, now U.S. Patent 3,441,649. The invention is based at least in part upon work done under a contract or grant from the United States Government.

This invention relates to a method for suppressing cardiac fibrillation and cardiac arrhythmias in animals, both human and otherwise, by administration of drugs. More particularly the invention relates to a method for suppressing fibrillation and treating arrhythmias by administration of N-benzyl N',N''-dimethylguanidine (bethanidine).

Ventricular fibrillation is a catastrophic event associated with a number of clinical situations that affect the heart, especially as a complication of acute myocardial infarction. Half of the cases of sudden death following acute coronary occlusion have been attributed to ventricular fibrillation. The prevention and treatment of this complication is clearly one of the urgent unsolved problems facing clinical medicine.

The drug administered according to the present invention is useful for the prevention and treatment of ventricular fibrillation and other ventricular arrhythmias brought about by various clinical situations which are prone to produce such arrhythmias, particularly myocardial infarction due to acute coronary occlusion or during episodes of acute coronary insufficiency likely to result in acute myocardial infarction. The drug is also useful for the prevention and treatment of arrhythmias resulting from digitalis intoxication, to be given during the period of such manifestations of toxicity until enough digitalis has been excreted so that the toxic state is ameliorated. In addition, this agent is useful in other clinical conditions that produce cardiac arrhythmias, particularly ventricular and atrial premature beats.

An agent that can suppress the vulnerability of the heart to ventricular fibrillation has obvious interest, both as a key to understanding the mechanism which triggers and sustains fibrillation and for potential clinical use in the prevention and/or treatment of this and other arrhythmias. In my copending application there is described a series of experiments which were undertaken to test the efficacy of bretylium tosylate in suppressing experimentally induced ventricular fibrillation in dog hearts, both with and without coronary ligation.

The successful use of bretylium in suppressing induced ventricular fibrillation suggested the use of other drugs that act on the sympathetic nerve system. A series of other drugs were tested for their possible protective effect against fibrillation but of these bethanidine (N-benzyl N',N'' - dimethylguanidine) was found to be most consistently successful. A series of experiments were conducted to demonstrate the effectiveness of this drug.

Methods

Mongrel dogs of either sex ranging in weight between 9 and 35 kg. were used in this study. Under nembutal anaethesia (15–30 mg./kg.) the heart was exposed. Needle electrodes were embedded in the four extremities for electrocardiographic recording. The femoral artery was cannulated for continuous blood pressure recording. A femoral vein was cannulated for injection. The pericardium was opened and the heart supported in a pericardial cradle. Ventricular fibrillation was induced by means of a pair of electrodes 1 cm. apart mounted on an insulated hand holder. The fibrillatory stimulus consisted of a continuous train of unipolar 2.5 millisecond pulses at a repetition rate of 100 pulses per second. The peak current for each pulse ranged between 20–40 milliamperes.

The routine run consisted of inducing ventricular fibrillation at 3 or 4 different sites at random over both ventricles. The heart was allowed to fibrillate for 5–20 seconds then electrically defibrillated by countershock from an AC defibrillator (usually requiring between 1–10 shocks). The heart was allowed 5 to 8 minutes to recover between episodes of fibrillation. After the stimulus time duration required to fibrillate the ventricle at several sites was established, 15 mg./kg. bethanidine (Burroughs Wellcome & Co.) was administered intravenously in from 1 to 5 minutes. At various times after the drug was administered the electrode was reapplied to the ventricle in the neighborhood of the control fibrillation sites and kept in contact for variable periods of time to determine the stimulus duration time required to provoke fibrillation. The electrode was usually removed when fibrillation appeared to be induced or when the blood pressure fell to shock levels for more than a few seconds.

Results

In the normal dog heart ventricular fibrillation was invariably induced by touching the electrode to the surface of the heart for between 0.25 to 0.35 second. There was no apparent difference in vulnerability to fibrillation by this stimulus between the right and left ventricles or between different sites on the ventricular surface.

The effect of rapid intravenous injection of bethanidine on blood pressure was measured and the usual response is a moderate drop in blood pressure followed by an increase above control levels. By the end of 15 minutes the blood pressure returns to control values. The heart rate sometimes increases about 20% for 15 to 20 minutes but then also returns to normal. When the drug is given more slowly (5 minutes) these effects are minimized.

After administration of the drug each animal was subjected to numerous attempts to provoke fibrillation by application of the electrodes to the ventricles at different sites. In every animal tested there was a clear prolongation of the time that the stimulating electrodes could be applied to the ventricular surface without provoking fibrillation. The protective effect in most animals began about 8 to 15 minutes after intravenous infusion of the drug and increased progressively to a maximum effect after 1½ to 2 hours. In each instance there was exhibited a progressive increase in tolerance to the fibrillatory stimulus. Two hours after the drug was given, there was an increase in tolerance that was never less than 3 times the control value while in some of the animals the stimulating electrodes could be applied to the ventricle for as long as 20 seconds without inducing fibrillation.

The tolerated duration of stimulation in such cases was limited by the severe hypotension from asystole rather than the onset of fibrillation. The protective effect was fairly uniform at different sites but the right ventricle, though protected, was often slightly more vulnerable than the left. When prolonged stimulation in a protected animal did provoke fibrillation, defibrillation was always easily achieved with a single low lever countershock.

Of significance was the frequent observation that when protection was effected the stimulated ventricle might break into ventricular tachycardia or fibrillation but when the stimulating electrode was removed the fibrillation or tachycardia would spontaneously revert to sinus rhythm even after prolonged periods of fibrillation.

The control dogs that were fibrillated every 20 minutes for 4 hours to rule out the effect of prolonged anaesthesia as a factor in the tolerance developed to the fibrillatory stimulus were never found to be protected. However, when they were subsequently given the drug they were protected as well as the other animals in the series.

The depth of anaesthesia was varied in a number of the control animals by allowing them to become lightly anaesthetized or giving them heavy doses of nembutal. Depth of anaesthesia was without detectable effect.

The protective effect of bethanidine is manifest in a number of observed ways. (a) The time that the fibrillatory stimulus can be tolerated without inducing fibrillation is prolonged from 3 to several hundred times. (b) The stimulating electrode may induce fibrillation for as long as it is held on the ventricle but the fibrillation is often localized to the region of the electrode and does not spread with normal sinus rhythm resuming as soon as the electrode is removed from the ventricle. (c) Fibrillation may be induced but then spontaneously reverts to sinus rhythm within a fraction of a second or as long as 20 seconds after the electrode is removed. (d) Defibrillation usually required multiple countershocks in the untreated heart but after the drug took effect the ventricle rarely required more than a single countershock to defibrillate.

Although not desiring to be bound by any particular theory, bethanidine is thought to act by altering membrane permeability of the heart muscle cells to various cations. Dosages range from about 1.0 to 50 mg. per kg. of body weight depending upon mode and frequency of administration. A patient anticipating heart surgery would normally be given two intramuscular or oral doses beginning one day before operation. In an emergency situation a larger intravenous dose would be given, usually accompanied by heart massage. A person likely to be susceptible to acute coronary occlusion or acute coronary insufficiency may be given prophylactic doses at time intervals ranging from once a day to three or four times a day for seven days after the attack.

The compound of the present invention may be presented in pharmaceutical preparations prepared by any of the well-known methods of pharmacy.

For oral administration, fine powders or granules of the compound may contain diluents and dispersing and surface active agents, and may be presented in a draft in water or in a syrup, in capsules or cachets in the dry state or in a non-aqueous suspension, when a suspending agent may be included; in tablets, when binders and lubricants may be included; or in a suspension in water or a syrup or an oil, or in a water/oil emulsion, when flavouring, preserving, suspending, thickening and emulsifying agents may be included. The granules or the tablets may be coated.

For parenteral administration, the compound may be presented in aqueous injection solutions which may contain antioxidants, buffers, bacteriostats, agents which solubilise a relatively insoluble compound, and solutes which render the salts isotonic with the blood; in aqueous suspension when suspending agents and thickening agents may be included; or in non-aqueous solutions and suspensions. Extemporaneous injection solutions may be prepared from sterile pills, granules or tablets which may contain diluents, dispersing and surface active agents, binders and lubricants.

A number of experiments were conducted in order to evaluate the effect of bethanidine in suppressing ventricular fibrillation. The following examples are illustrative:

Example I

The fibrillation threshold of a 16.5 kg. female dog was measured at 20 ma.–30 ms. This dog had been given no pretreatment. Bethanidine was administered intravenously over a six minute period at the rate of 15 mg./kg. One hour and forty-four minutes after initial administration of bethanidine the fibrillation thershold was again determined and found to be 45 ma.–110 ms., an increase of 125%.

Example II

A female dog weighing 10.2 kg. was pretreated by administration of bethanidine intramuscularly at the rate of 30 mg./kg. at 4:30 in the afternoon of the first day. This dog was anaesthesized the following morning at 8:30. At 11:32 the fibrillation threshold was measured at 45 ma.–150 ms., an increase of 86 percent over the average normal. The place of the electrodes was changed and at 12:25 p.m. there was no good responses to stimulation, the thresholds being higher than 55 ma. The position of the electrodes was again changed and at 12:30 the fibrillation threshold was measured at 43 ma.–170 ms. Between 12:50–12:55 a further dose of bethanidine was administered intravenously at the rate of 15 mg./kg. By 1:35 the heart was found to be very protected. It comes out of fibrillation by itself in two to three seconds. At 2:00 p.m. the threshold was measured at 63 ma.–160 ms. The place of the electrodes was again changed at 2:53 the fibrillation threshold was measured at 82 ma.–155 ms. At 2:56 the heart was found to come out of fibrillation following massage after it had been fibrillating for 30 seconds induced by stimulation at 82 ma.–155 ms. At 3:15 after 50 seconds of fibrillation induced by stimulating at 86 ma.–160 ms. (a threshold increase of 282%) the heart does not spontaneously defibrillate but one shock is enough to defibrillate the heart.

Example III

Bethanidine was administered to a 39 year old man who had a mitral valve replaced. Three hours after surgery he had an episode of superventricular tachycardia associated with signs of heart failure. He was given 2 mg./kg. of bethanidine intramuscularly and 40 minutes later reverted back to sinus rhythm. He was kept on bethanidine 2 mg./kg. every twelve hours for 2 days without recurrence of the arrhythmia. He was discharged 4 weeks after surgery following an uneventful recovery.

I claim:
1. A method for suppressing ventricular fibrillation and cardiac arrhythmias in living beings which comprises administering bethanidine to said beings in a small but effective amount at least sufficient to restore sinus rhythm.

2. A method according to claim 1 further characterized in that said drug is administered in amounts ranging from about 1.0 to 50 mg. per kg. of body weight.

3. A method according to claim 2 further characterized in that said drug is administered in aqueous solution intramuscularly in amounts ranging from about 1 to 20 mg. per kg. of body weight at time intervals ranging from about every 6 to 8 hours to once a day.

4. A method according to claim 1 further characterized in that said drug is administered in oral dosage at time intervals ranging fom about every 6 to 8 hours to once a day.

5. A method according to claim 2 further characterized in that said drug is administered in emergency treatment of acute coronary occlusion intravenously in aqueous solution in amounts ranging from about 2 to 50 mg. per kg. of body weight accompanied by vigorous massage to hasten circulation of said drug to the heart and overcome resistance to electrical defibrillation.

6. A method according to claim 2 further characterized in that said drug is administered in emergency treatment of acute coronary insufficiency intravenously in aqueous solution in amounts ranging from about 2 to 50 mg. per kg. of body weight accompanied by vigorous massage to hasten circulation of said drug to the heart and overcome resistance to electrical defibrillation.

References Cited

American Drug Index (1965), p. 105.

ALBERT T. MEYERS, Primary Examiner

S. J. FRIEDMAN, Assistant Examiner